Nov. 23, 1943. J. H. HOTSON 2,334,705
COLLAR BAR
Filed March 1, 1941 2 Sheets-Sheet 1
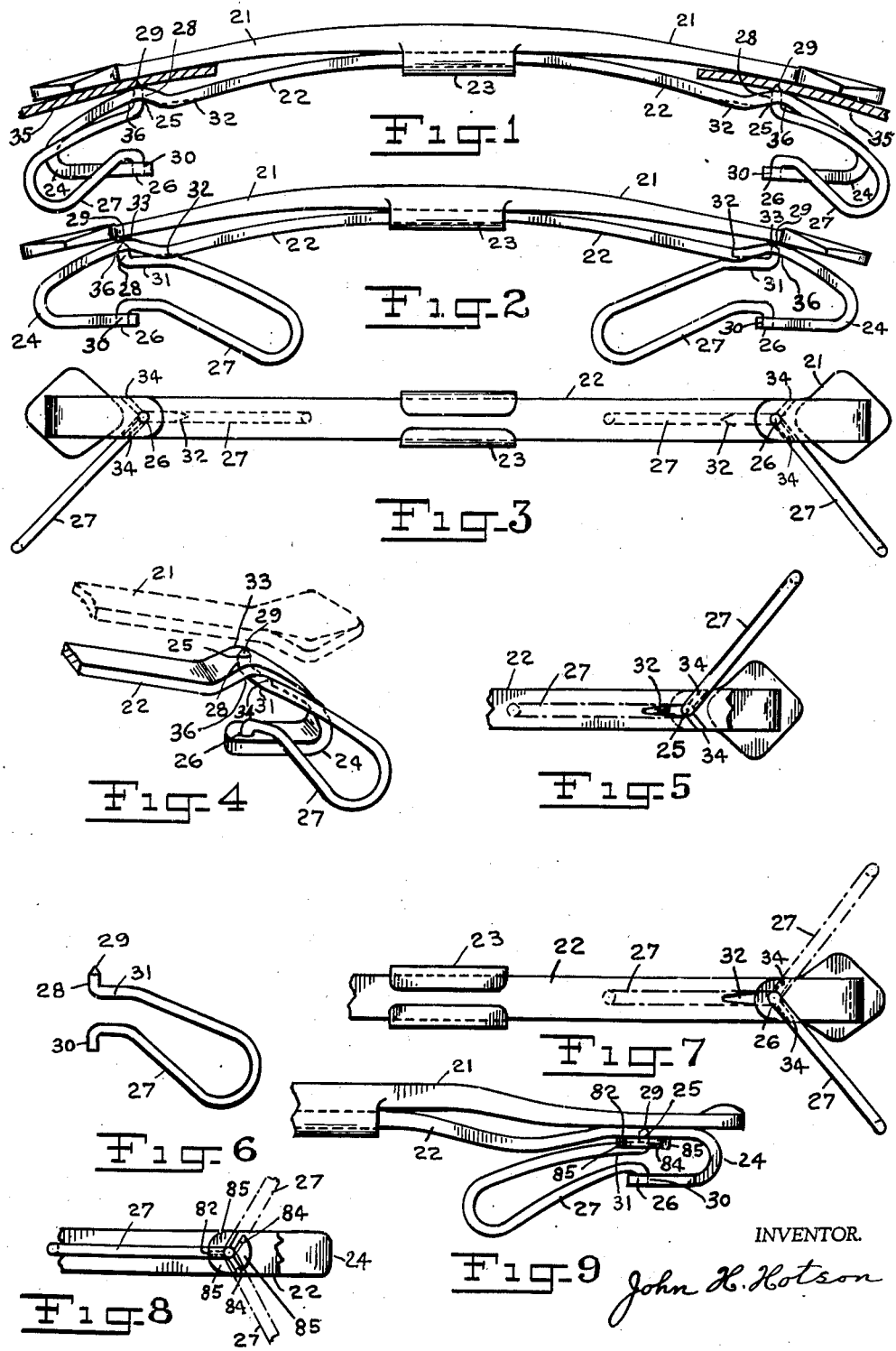
INVENTOR.
John H. Hotson

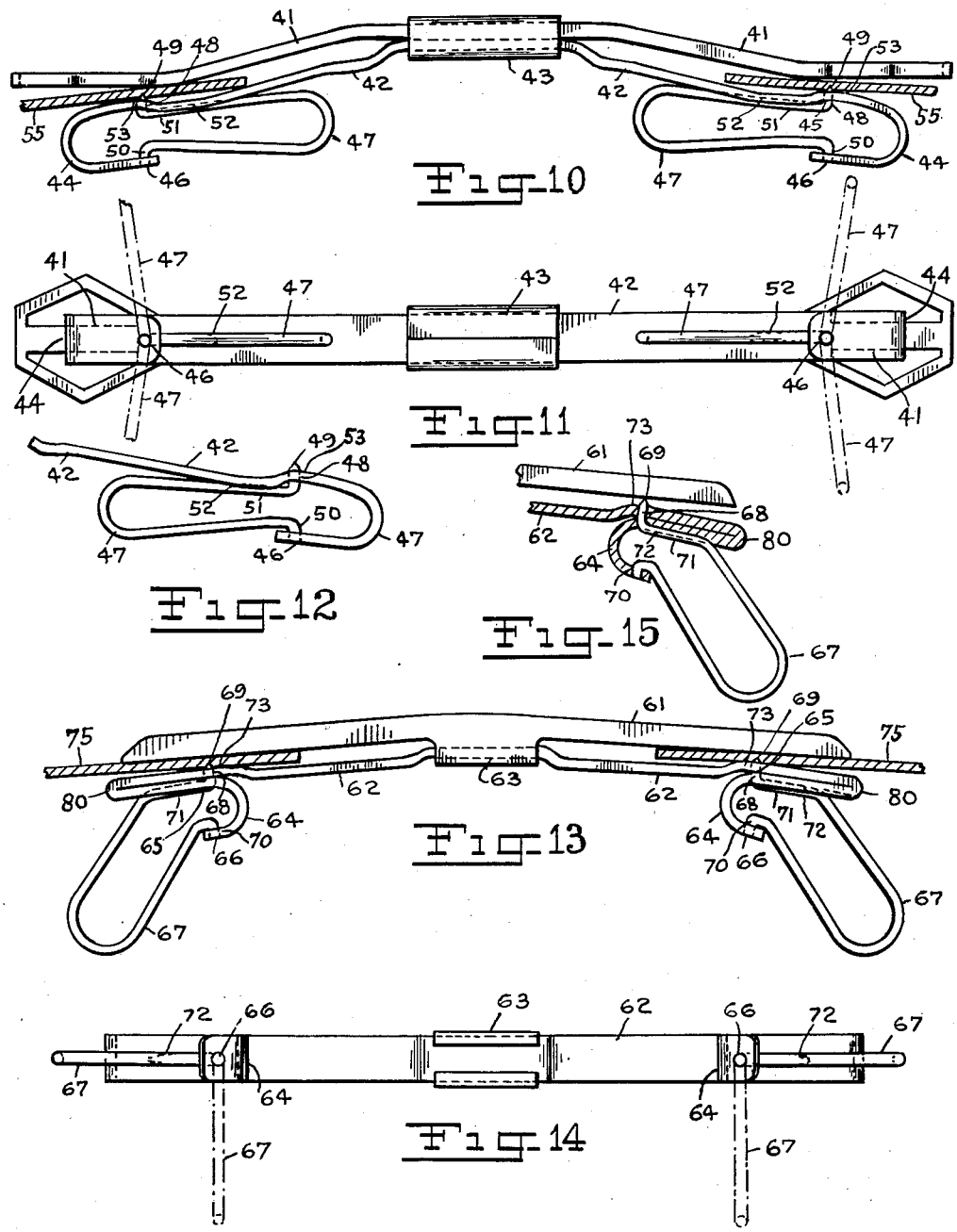

Patented Nov. 23, 1943

2,334,705

UNITED STATES PATENT OFFICE 2,334,705

COLLAR BAR

John H. Hotson, Woodside, N. Y.

Application March 1, 1941, Serial No. 381,297

10 Claims. (Cl. 24—81)

This invention relates to collar bars which are used for the purpose of holding down the wings of a collar and keeping them from spreading apart unduly.

The principal object of the invention is to provide, in a collar bar, simple, inexpensive, efficient and convenient gripping or locking means for holding in desired position the two wings of an ordinary collar, in such a way as to prevent the bar from slipping off, which is a very common fault of the ordinary collar bars.

Further objects and advantages of the invention will be in part set forth in the following specification and in part will be obvious therefrom without being specifically pointed out, the same being realized and attained as hereinafter more fully described, or as pointed out in the claims hereof.

With the above and other objects of the invention in view, the invention consists in the novel construction, arrangement and combination of various devices, elements and parts as set forth in the claims hereof, certain embodiments of the same being illustrated in the accompanying drawings and described in this specification.

In these drawings and this specification, the terms top, bottom, front, rear, upward, downward, forward, rearward, forwardly, and horizontal, are used in relation to the position the device is in when attached to the wings of a collar of a wearer sitting or standing in an upright position, or when the device is in position about to be so attached.

In the said drawings (on an enlarged scale):

Fig. 1 shows one embodiment of my invention, being a top view of same when attached to the wings of a collar.

Fig. 2 shows the same when in position about to be attached to the wings of a collar.

Fig. 3 shows a rear view of the embodiment in Figs. 1 and 2.

Fig. 4 shows a perspective view of the right hand end of the construction shown in Figs. 1, 2 and 3, with the portions of the front and rear bars shown slightly separated, the better to show the detail.

Fig. 5 is an end portion of Fig. 3 showing the loop turned upwards instead of downwards as in Fig. 3.

Fig. 6 is a view of the loop.

Fig. 7 is a portion of Fig. 3 with the loop shown in three positions, one in full line, and the other two in dotted lines.

Fig. 8 is a rear vew of a portion of the rear bar member with the end loop thereof partially cut away and showing an alternative means for extruding and retracting the clamping point.

Fig. 9 is a top view of the same means.

Fig. 10 is a top view of another embodiment of my invention showing the device attached to the wings of a collar.

Fig. 11 is a rear view of Fig. 10, showing also, in dotted lines, the position of the loops when the device is about to be attached to the wings of a collar.

Fig. 12 is a detail view of the right hand end portion of the rear bar member shown in Figs. 10 and 11.

Fig. 13 is a top view of another modification of my invention attached to the wings of a collar.

Fig. 14 is a rear view of Fig. 13, showing also, in dotted lines, the loops in position about to be attached to the wings of a collar.

Fig. 15 is a detail, partly in section, of Fig. 13, with the portions of front and rear bar members shown slightly separated.

In carrying my invention into effect in the preferred embodiment thereof which has been selected for illustration in Figs. 1 to 9, it will be seen that there is provided a collar bar comprising a front bar member 21 and a rear bar member 22. The members 21 and 22 are secured together at their central parts by a binding member 23, which in this case is integral wth the front member 21, but which, if desired, may be a separate member as shown in the modification in Fig. 10.

The member 21 is preferably made of somewhat rigid material and the member 22 of resilient material, although this condition may be reversed if desired without interfering with the operation of my device. The members are so arranged that their oppositely disposed end portions bear resiliently against each other, although this is not essential to my invention, as the oppositely disposed end portions may be arranged with a slight gap between them. The member 22 is preferably constructed of sheet metal, which is bent into the shape shown, including loops 24 at the ends, which are provided with oppositely disposed sockets 25 and 26, in which are pivoted the two ends of a preferably resilient loop 27, preferably made of wire, the forward end of which 28 is provided with a point 29 and is pivoted in the socket 25, which completely pierces member 22, the rearward end 30 of said loop 27 being pivoted in the socket 26, which may or may not pierce through the metal. The points 29 are preferably made tapered, although this is not essential to the operation of my invention.

When loops 27 are in position as in Fig. 2, i. e., with the device not yet attached to the collar, they are lightly held in that position against accidental displacement by the offset portion or shoulder 31 (Fig. 6) resting in a preferably shallow groove 32 in the member 22, the groove 32 being shown in Figs. 5 and 7 and in dotted lines in Figs. 1 and 2, and the loop 27 being shown, in dotted lines, retained in said groove 32 in Figs. 5 and 7. In this position the point 29 is adapted to rest level with or slightly below the surface of the bulging portion 33 (Figs. 4, 2) of the member 22 where it contacts the member 21. This is so designed in order that the oppositely disposed jaws formed by the end portions of the front and rear bar members may be slipped smoothly over the wing of a collar without interference from the point 29. When the device is thus slipped over the wings of a collar, the loops 27 are then rotated by the fingers or thumbs to the position as shown in Figs. 1, 4, 5 and 7, where the shoulder 31 moves forward into the depression 36 on the side of member 22 opposite to the bulge 33, and the said shoulder 31 rests in a groove 34 in said depression 36, the said groove being designed to retain the member 27 in its operative position against accidental displacement. In this position the point 29 is adapted to project beyond the bulge 33, and by pressing against and preferably penetrating the under surface of the collar wing 35, to lock the device thereon and prevent it from slipping off the collar wing, the point 29 being held against the underside of the collar wing by spring tension of the member 27.

If preferred, the member 27 may be constructed of rigid material and the loop 24 may be made sufficiently resilient to furnish the spring tension adapted to push the point 29 against the collar wing.

The parts may be so adjusted that the points 29 are preferably not permitted to extend beyond the surface 33 sufficiently to penetrate all the way through the wing of an ordinary collar, but may penetrate it part way, so that the outer surface of the collar wing may not be pierced.

The grooves 34 are provided on both sides of the member 22, so that the loops 27 may be rotated either upwards or downwards as desired by the wearer, and the said grooves 34 are formed diagonally of the member 22, so that the loops 27 may be retracted farther underneath the wing of the collar and thus be better concealed from view when the collar bar is being worn.

It is obvious that without the grooves 34 the points 29 could be adapted to project beyond the surface of the bulge 33 simply by means of the depression 36, but the grooves are provided as shown with the further purpose of retaining the loops in the more retracted and out-of-the-way position as shown in Figs. 1, 3, 4, 5 and 7.

I do not limit myself to a bulge such as 33 in the member 22 together with a depression such as 36. Other means to secure the same end of extruding and retracting the points 29 will suggest themselves, such as embossments 85 (Figs. 8 and 9) on the rear side of member 22 around the socket hole 25 (see Fig. 9) with gaps 84 between same to allow the shoulder 31 to fit therein and thereby adapting the point 29 to extend forward beyond the front surface of the member 22, and a shallower groove 82 designed for the shoulder 31 to rest in when in inoperative position. Other equivalent means for effecting the extrusion and retraction of the points 29 will occur to any one skilled in the art. For example the end portion 28 might be provided with a short spur adapted to limit its forward projection, which spur might be adapted to drop into a depression in the rear bar member adjacent the pivot socket when it is desired to have the end portion project, and said spur would ride up on to the undepressed portion of the rear bar member adjacent the socket when it is desired to retract the end portion.

The reason I prefer the embodiment shown in Figs. 1 to 9 is that when the device is about to be attached to the wings of a collar the loops are provided to lie parallel with the bar members, and in this position they are adapted to remain out of the way of colliding with the collar edges while the device is being pushed on to the collar wings preparatory to rotating the loop and locking device on to the collar.

In the modification of my invention shown in Figs. 10, 11 and 12, the positions of the loop are reversed. The inoperative position is shown in Fig. 11 and the operative position in Fig. 10.

A front bar member 41 and a rear bar member 42 are attached together by a binding member 43. The bar member 42 has loops 44 at the ends bent similarly to the loops 24 in the first embodiment mentioned above, which loops are provided with sockets 45 and 46 similarly positioned.

Resilient loops 47 are provided with pivot portions 48 and 50, the portions 48 being provided with points 49, which serve the same purpose as the corresponding points 29 in the first embodiment. In order to attach this modification to the collar, the loops 47 are set in the position shown in Fig. 11, where (similarly as in Fig. 2) the points 49 are level with or a little below the front surface of the bulge 53, so as to allow the wing 55 of the collar to slip between the members 41 and 42, whereupon the loops 47 are rotated to a position parallel with the bar members, and the shoulder 51 snaps into the groove 52, whereby the points 49 are adapted to push out beyond the surface of 53 and push against and preferably penetrate the under side of the collar wing 55. The loops in this modification thus remain parallel with the bar members while the article is worn. And in order to retract the points 49 preparatory to removing the collar bar, the loops are rotated to the position shown in Fig. 11, in dotted lines.

In the modification shown in Figs. 13, 14 and 15 a front bar member 61 is attached to a rear bar member 62 by means of a binder 63. The bar member 62 is folded over on itself at 80 and the ends bent into a loop at 64, in the end portions of which are provided sockets 66, adapted to receive the pivot portions 70 of the loops 67, and oppositely disposed sockets 65 in the bulge 73 are adapted to receive the pivoting portions 68 of the loops 67. To prepare this modification for attachment to the collar, the loops 67 are placed in the position as shown in dotted lines in Fig. 14, in which position the points 69 do not project beyond the surface of 73, and the collar bar can be slipped on the collar wings 75 without resistance from the points. When the loop is rotated to a position parallel with the bar members, the shoulder 71 of the loop 67 snaps into a groove 72, whereby the points 69 spring out beyond the bulge 73 and press against and preferably penetrate the under surface of the collar wings 75, thus firmly gripping the collar and preventing the collar bar from slipping.

Other advantages of the invention will be obvious from what has been said above with regard to its construction and operation.

I do not limit myself to the particular details of construction set forth in the foregoing specification and illustrated in the accompanying drawings, as the same refer to and set forth only certain embodiments of the invention, and it is obvious that the same may be modified within the scope of the appended claims without departing from the spirit and scope of the invention.

Having thus described my invention, what I claim as new and desire to secure by Letters Patent is as follows:

1. In a collar bar, in combination, a front bar member, a rear bar member having a perforation therein, means rigidly connecting said bar members together at a point removed from said perforation, and a movable member pivotally engaging said rear bar member and having a portion extending forwardly through said perforation and resiliently urged into clamping relation with said front bar member, said movable member swinging on an axis the direction of which approximately coincides with the direction in which the forwardly extending portion of said movable member is urged towards the front bar member.

2. A collar bar as characterized in claim 1, and in which the said forwardly extending portion is tapered.

3. A collar bar comprising in combination a front bar member, a rear bar member provided with a perforation, means rigidly connecting said front and rear bar members together at a point removed from said perforation, a movable member pivotally engaging said rear bar member and having a portion extending forwardly through said perforation and resiliently urged into clamping relation with said front bar member, said rear bar member having portions of its rear surface near said perforation which are respectively farther from and nearer to said front bar member relatively to each other, said movable member having a portion near said perforation alternatively cooperating with said farther and nearer surface portions to control the relative projection of said forwardly extending portion through said perforation.

4. A collar bar comprising in combination a front bar member, a rear bar member having a perforation therein, means rigidly connecting said bar members together at a point removed from said perforation, a movable member pivotally engaging said rear bar member and having a portion extending forwardly through said perforation and resiliently urged into clamping relation with said front bar member, said rear bar member having portions of its rear surface near said perforation which are respectively farther from and nearer to said front bar member relatively to each other and depressions in said relatively farther and nearer surface portions to retain said movable member in engagement with said farther and nearer portions, respectively, against accidental displacement, said movable member having a portion alternatively co-operating with said farther and nearer surface portions to control the relative projection of said forwardly extending portion through said perforation.

5. In a collar bar, in combination, a front bar member, a rear bar member having a perforation therein, means rigidly connecting said bar members together at a point removed from said perforation, a movable member pivotally engaging said rear bar member and having a portion extending forwardly through said perforation and urged into clamping relation with said front bar member, said rear bar member being provided with means securing said movable member in pivotal connection with said rear bar member; means whereby when said movable member is turned to an inoperative position said portion is adapted to be retained from projecting beyond the adjacent front surface of the said rear bar member; and means whereby when said movable member is turned to an operative position said portion bears against the inner surface of a collar wing when same is interposed between the oppositely disposed end portions of said front and rear bar members; said movable member swinging on an axis the direction of which approximately coincides with the direction in which the forwardly extending portion of said movable member is urged towards the front bar member.

6. A collar bar comprising in combination a front bar member, a rear bar member provided with a perforation, means rigidly connecting said front and rear bar members together at a point removed from said perforation, a movable member pivotally engaging said rear bar member and having a portion extending forwardly through said perforation and resiliently urged into clamping relation with said front bar member, said rear bar member having portions of its rear surface near said perforation which are respectively farther from and nearer to said front bar member relatively to each other, said movable member having a portion near said perforation alternatively co-operating with said farther and nearer surface portions to control the relative projection of said forwardly extending portion through said perforation, said farther and nearer portions respectively being so arranged with relation to each other that when the said portion of said movable member near said perforation is cooperating with the said farther surface portion said movable member is substantially parallel with the said bar members.

7. In a collar bar, in combination, a front bar member, a rear bar member having a perforation therein, means rigidly connecting said bar members at a point removed from said perforation, and a loop shaped member pivotally engaging said rear bar member and having a portion extending forwardly through said perforation and resiliently urged into clamping relation with said front bar member.

8. In a collar bar, in combination, a front bar member, a rear bar member having a perforation therein, means rigidly connecting said bar members together at a point removed from said perforation, a movable member having a portion pivotally engaging said rear bar member at a point removed from said perforation and a portion extending forwardly through said perforation and pivotally engaging therein and resiliently urged into clamping relation with said front bar member, said movable member swinging on an approximately horizontal axis and longitudinally of said bar members.

9. In a collar bar, in combination, a front bar member, a rear bar member having a perforation therein, means rigidly connecting said bar members together at a point removed from said perforation, said rear bar member having at each end an inturned end portion provided with a socket near its end and said rear bar member having a perforation therein oppositely disposed to said socket, a loop member having a rear portion pivotally engaging the said socket and a forward portion pivotally engaging said perforation and extending forwardly therethrough and resiliently urged into clamping relation with said front bar member.

10. A collar bar, each end portion of which forms a front jaw, a rear jaw at each end oppositely disposed to said front jaw and connected therewith, said rear jaw having a perforation therein, a swingable member pivotally engaging said perforation and having a portion extending forwardly through said perforation and into clamping relation with said front jaw, said swingable member moving on an axis the direction of which approximately coincides with the direction in which the forwardly extending portion of said swingable member extends towards the said front jaw.

JOHN H. HOTSON.